US012602029B2

(12) United States Patent
Das et al.

(10) Patent No.: US 12,602,029 B2
(45) Date of Patent: Apr. 14, 2026

(54) METHOD AND SYSTEM FOR TASK PLANNING FOR VISUAL ROOM REARRANGEMENT UNDER PARTIAL OBSERVABILITY

(71) Applicant: Tata Consultancy Services Limited, Mumbai (IN)

(72) Inventors: Dipanjan Das, Kolkata (IN); Karan Mirakhor, Kolkata (IN); Sourav Ghosh, Kolkata (IN); Brojeshwar Bhowmick, Kolkata (IN)

(73) Assignee: Tata Consultancy Services Limited, Mumbai (IN)

( * ) Notice: Subject to any disclaimer, the term of this patent is extended or adjusted under 35 U.S.C. 154(b) by 29 days.

(21) Appl. No.: 18/760,514

(22) Filed: Jul. 1, 2024

(65) Prior Publication Data

US 2025/0053156 A1 Feb. 13, 2025

(30) Foreign Application Priority Data

Aug. 10, 2023 (IN) .............................. 202321053698

(51) Int. Cl.
G05B 19/4155 (2006.01)
B25J 9/16 (2006.01)

(52) U.S. Cl.
CPC ........ G05B 19/4155 (2013.01); B25J 9/1661 (2013.01); *G05B 2219/40113* (2013.01); *G05B 2219/50391* (2013.01)

(58) Field of Classification Search
CPC ...... B25J 9/1661; B25J 9/1664; B25J 9/1697; G05B 19/4155; G05B 2219/40113;

(Continued)

(56) References Cited

U.S. PATENT DOCUMENTS

2020/0316782 A1* 10/2020 Chavez ................. B25J 9/1697
2022/0168893 A1* 6/2022 Hamilton .............. B25J 9/1697
(Continued)

FOREIGN PATENT DOCUMENTS

CN 115063428 A 9/2022

OTHER PUBLICATIONS

K. Niranjan Kumar et al., "Graph-based Cluttered Scene Generation and Interactive Exploration using Deep Reinforcement Learning," 2021, https://arxiv.org/pdf/2109.10460.
(Continued)

*Primary Examiner* — Wade Miles
*Assistant Examiner* — Zachary Joseph Wallace
(74) *Attorney, Agent, or Firm* — Finnegan, Henderson, Farabow, Garrett & Dunner, LLP

(57) ABSTRACT

A method and system for task planning for visual room rearrangement under partial observability is disclosed. The system or the robotic agent utilizes a visual input to efficiently plan a sequence of actions for simultaneous object search and rearrangement in an untidy room, to achieve a desired tidy state. Unlike search networks in the art that follow ad hoc approach, the method discloses a search network utilizing commonsense knowledge from large language models to find unseen objects. A Deep RL network used for task planning is trained with proxy reward, along with unique graph-based state representation to produce a scalable and effective planner that interleaves object search and rearrangement to minimize the number of steps taken and overall traversal of the agent, and to resolve blocked goal and swap cases. Sample efficient cluster-biased sampling is utilized for simultaneous training of the proxy reward network along with the Deep RL network.

20 Claims, 6 Drawing Sheets

(58) Field of Classification Search
    CPC ........... G05B 2219/40114; G05B 2219/50391;
                    G06N 3/006; G06V 10/82; G06V 20/10;
                                            G06V 20/70
    See application file for complete search history.

(56)                References Cited

U.S. PATENT DOCUMENTS

| | | | |
|---|---|---|---|
| 2023/0234233 A1* | 7/2023 | Goyal | G06T 7/269 |
| 2024/0160797 A1* | 5/2024 | Narayana | G06V 10/82 |
| 2025/0182444 A1* | 6/2025 | Savvides | G06V 10/809 |

OTHER PUBLICATIONS

Author: Sourav Ghosh et al., "Planning Large-scale Object Rearrangement Using Deep Reinforcement Learning," 2022 International Joint Conference on Neural Networks (IJCNN), 2022 IEEE, https://ieeexplore.ieee.org/document/9889793.
Zirui Zhao et al., "Large Language Models as Commonsense Knowledge for Large-Scale Task Planning," 37th Conference on Neural Information Processing Systems (NeurIPS 2023), 2023, https://arxiv.org/pdf/2305.14078.
Xavier Giró-i-nieto et al., "Hierarchical Object Detection with Deep Reinforcement Learning," Deep Reinforcement Learning Workshop (NIPS 2016), 2016, https://arxiv.org/pdf/1611.03718.

* cited by examiner

200 capturing, by a robotic agent, an egocentric view of a room in an untidy current state comprising one or more objects among a plurality of objects in the room misplaced from associated receptacles, wherein the robotic agent is currently at a random location in the room with partial observability of the room — 202 identifying an unseen object list by comparing i) a visible object list obtained from the egocentric view and ii) an object list of the plurality of objects created by the robotic agent in accordance with a user-specified tidy goal state — 204 triggering a LLM based search network to predict a probable receptacle for each unseen object from among the unseen object list, wherein the LLM based search network applies a two steps search technique comprising SRTN and SCN — 206 creating a graph embedding from the spatial graph representation of the untidy current state and the user-specified tidy goal state via a modified graph representation network (GRN), trained using an encoder and a decoder — 208 task planning for visual room rearrangement via a P-DQN with hybrid action space comprising a discrete action, denoting an index of a selected unseen object or the probable receptacle, followed by a continuous parameter which signifies a location for object placement or receptacle search, wherein the P-DQN uses a proxy reward network trained with episodic reward — 210

FIG. 2

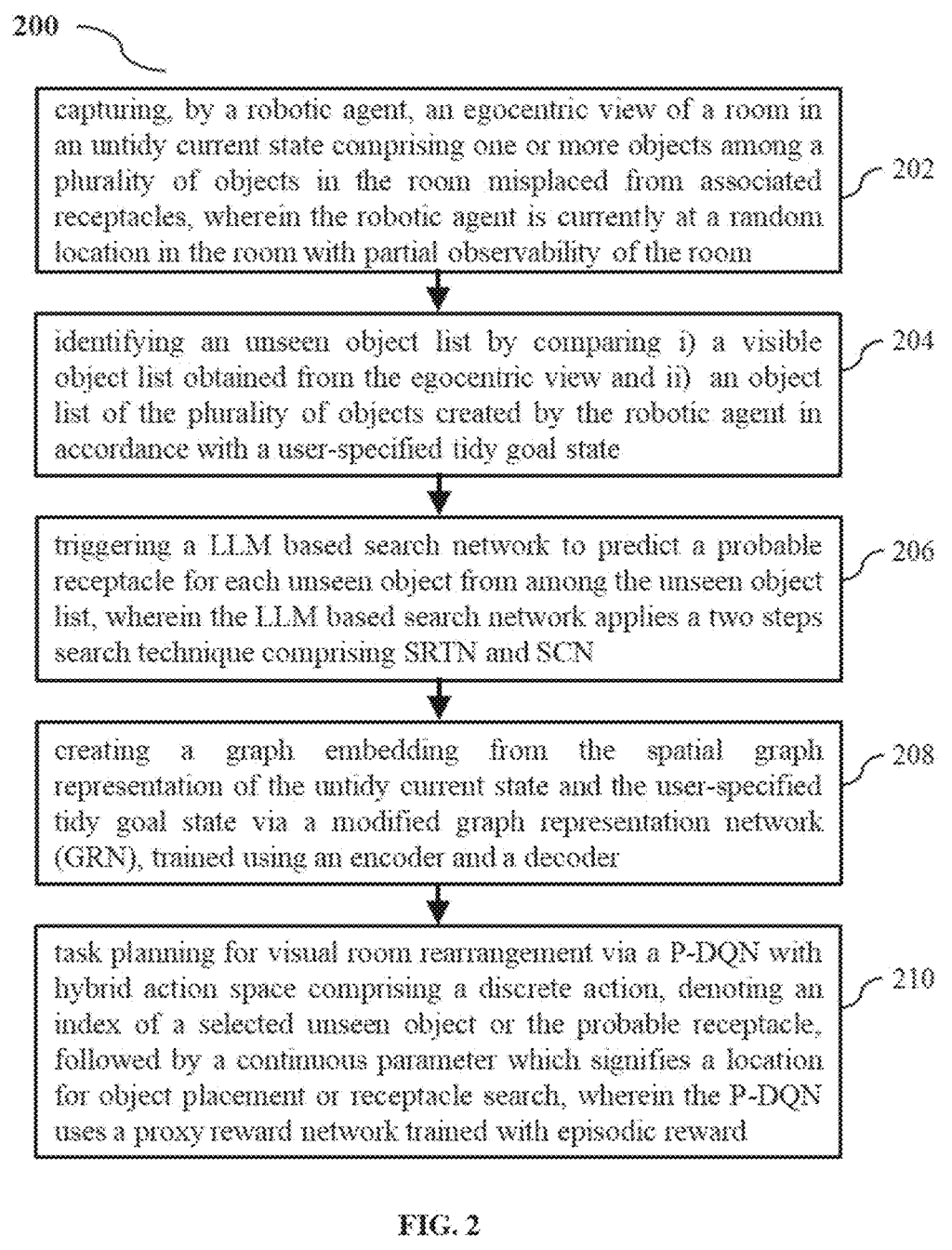

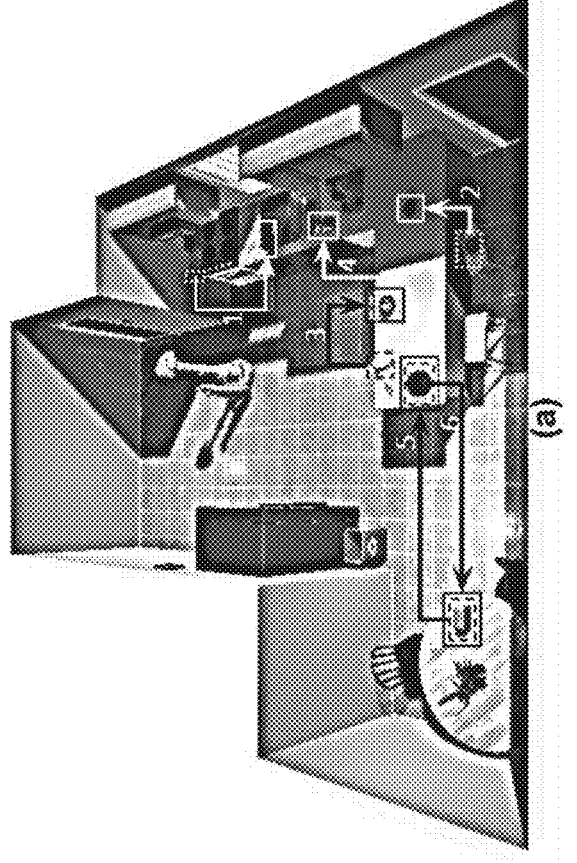
FIG. 3

METHOD AND SYSTEM FOR TASK PLANNING FOR VISUAL ROOM REARRANGEMENT UNDER PARTIAL OBSERVABILITY

PRIORITY

This U.S. patent application claims priority under 35 U.S.C. § 119 to: India Application No. 202321053698, filed on Aug. 10, 2023. The entire contents of the aforementioned application are incorporated herein by reference.

TECHNICAL FIELD

The embodiments herein generally relate to the field of robotics and, more particularly, to a method and system for task planning for visual room rearrangement under partial observability.

BACKGROUND

Robotic assistance in day-to-day work is gaining momentum. Tidying a disordered room based on user specifications is one such a challenging task for robotic agents as it involves addressing issues related to perception, planning, navigation, and manipulation. An robotic agent or agent performing an embodied room rearrangement must use the sensor observations and a prior knowledge to produce a long horizon plan for generating a sequence of object movements to achieve the tidy goal state. This goal state is specified through geometry, images, language, etc. The majority of the existing research on room rearrangement emphasizes perception and commonsense reasoning while assuming navigation and manipulation abilities, without incorporating efficient planning. Based on the goal state definition, they broadly fall into two categories. First type goal state definition refers to the commonsense based reasoning without a predefined goal state. Existing methods in this category utilize image or language-based commonsense reasoning to identify if an object is misplaced from the correct receptacles in their ego-view or egocentric view, followed by rearranging them using a suboptimal heuristic planner. Moreover, utilizing text or semantic relation-based anomaly detectors to identify misplaced objects does not resolve blocked goal or swap cases, where an object's goal position is obstructed by another misplaced object or vice versa. The second type of type goal state definition refers to user-specific room rearrangement with a pre-defined tidy goal state, wherein the rearrangement is done based on explicit user specification. Existing methods focus on egocentric perception and use image or image feature-based scene representation to identify misplaced objects and a greedy planner to sequence actions for rearrangement. Some existing approaches proposed performing a user-specific room rearrangement by using semantic relations to identify misplaced objects in ego-view, and then rearrange them as they appear without planning. These existing methods explicitly explore the room to find objects that are initially outside the agent's ego-view, since it only provides a partial information about the room. However, these approaches incur a significant traversal cost due to exploration. Additionally, these existing approaches employ non-optimal planning that does not optimize the number of steps or overall agent traversal.

In contrast, efficient planning makes rearrangement more effective by optimizing the sequence of actions and minimizing the time and effort required to achieve the goal state. One of the works in literature addresses the rearrangement task planning problem by assuming the complete visibility of the room, through the bird's eye view. The above mentioned work addresses some planning problems, such as the combinatorial expansion of rearrangement sequencing, and blocked goal and swap cases without explicit buffer. However, the approach does not minimize overall agent traversal during the planning, and its state representation is not scalable to large numbers of objects. Moreover, their reliance on the ground truth object positions in both the current and goal states is impractical in real-life. Partial observability of a room itself is a hurdle in room rearrangement task. Thus, exploring techniques for room rearrangement problems that provide efficient task planning under partial observability of a room is an open area of research.

SUMMARY

Embodiments of the present disclosure present technological improvements as solutions to one or more of the above-mentioned technical problems recognized by the inventors in conventional systems.

For example, in one embodiment, a method for task planning for visual room rearrangement under partial observability is provided. The method includes capturing an egocentric view of a room in an untidy current state comprising one or more objects among a plurality of objects in the room misplaced from associated receptacles, wherein the robotic agent is currently at a random location in the room with partial observability of the room.

Further, the method includes identifying an unseen object list by comparing i) a visible object list obtained from the egocentric view and ii) an object list of the plurality of objects created by the robotic agent in accordance with a user-specified tidy goal state.

Further, the method includes triggering a large language model (LLM) based search network to predict a probable receptacle for each unseen object from among the unseen object list, wherein the LLM based search network applies a two steps search technique comprising: (a) filtering out, via a sorting network (SRTN), a set of receptacles from an object-receptacle list generated during learning phase of the robotic agent list, wherein the filtering is in context of the unseen object list, wherein the filtered out set of receptacles belong to an implausible class; and (b) identifying a most probable receptacle for the unseen object based on a probability score metric computed by a Scoring Network (SCN); wherein the robotic agent assumes the position of the unseen object to be the position of its most probable receptacle from the object-receptacle list created by the robotic agent in accordance with a user-specified tidy goal state, and wherein the robotic agent replans the search based on one or more conditions experienced during task planning execution.

Furthermore, the method includes creating a graph embedding from the spatial graph representation of the untidy current state and the user-specified tidy goal state via a graph representation network (GRN), trained using an encoder and a decoder, to generate meaningful embeddings from the untidy current state and the user-specified tidy goal state graph that incorporates a residual relative path length notion between every pair of nodes associated with the untidy current state and the user-specified tidy goal state.

Furthermore, the method includes task planning for visual room rearrangement via a Parameterized Deep-Q Network (P-DQN) with hybrid action space comprising a discrete action, denoting an index of a selected unseen object or the probable receptacle, followed by a continuous parameter which signifies a location for object placement or receptacle search, wherein the P-DQN uses a proxy reward network trained with episodic reward, generated from the stepwise hierarchical dense reward and overall episodic path length. The graph embedding enables state space of the P-DQN to understand semantic and geometric information of the untidy current state and the user-specified tidy goal state In another aspect, a robotic agent for task planning for visual room rearrangement under partial observability is provided. The robotic agent, also referred to as system comprises a memory storing instructions; one or more Input/Output (I/O) interfaces; and one or more hardware processors coupled to the memory via the one or more I/O interfaces, wherein the one or more hardware processors are configured by the instructions to capture an egocentric view of a room in an untidy current state comprising one or more objects among a plurality of objects in the room misplaced from associated receptacles, wherein the robotic agent is currently at a random location in the room with partial observability of the room.

Further, the one or more hardware processors are configured by the instructions to identify an unseen object list by comparing i) a visible object list obtained from the egocentric view and ii) an object list of the plurality of objects created by the robotic agent in accordance with a user-specified tidy goal state.

Further, the one or more hardware processors are configured by the instructions to trigger a large language model (LLM) based search network to predict a probable receptacle for each unseen object from among the unseen object list, wherein the LLM based search network applies a two steps search technique comprising: (a) filtering out, via a sorting network (SRTN), a set of receptacles from an object-receptacle list generated during learning phase of the robotic agent list, wherein the filtering is in context of the unseen object list, wherein the filtered out set of receptacles belong to an implausible class; and (b) identifying a most probable receptacle for the unseen object based on a probability score metric computed by a Scoring Network (SCN); wherein the robotic agent assumes the position of the unseen object to be the position of its most probable receptacle from the object-receptacle list created by the robotic agent in accordance with a user-specified tidy goal state, and wherein the robotic agent replans the search based on one or more conditions experienced during task planning execution.

Furthermore, the one or more hardware processors are configured by the instructions to create a graph embedding from the spatial graph representation of the untidy current state and the user-specified tidy goal state via a graph representation network (GRN), trained using an encoder and a decoder, to generate meaningful embeddings from the untidy current state and the user-specified tidy goal state graph that incorporates a residual relative path length notion between every pair of nodes associated with the untidy current state and the user-specified tidy goal state.

Furthermore, the one or more hardware processors are configured by the instructions to perform task planning for visual room rearrangement via a Parameterized Deep-Q Network (P-DQN) with hybrid action space comprising a discrete action, denoting an index of a selected unseen object or the probable receptacle, followed by a continuous parameter which signifies a location for object placement or receptacle search, wherein the P-DQN uses a proxy reward network trained with episodic reward, generated from the stepwise hierarchical dense reward and overall episodic path length.

In yet another aspect, there are provided one or more non-transitory machine-readable information storage mediums comprising one or more instructions, which when executed by one or more hardware processors causes a method for task planning for visual room rearrangement under partial observability.

The method includes capturing an egocentric view of a room in an untidy current state comprising one or more objects among a plurality of objects in the room misplaced from associated receptacles, wherein the robotic agent is currently at a random location in the room with partial observability of the room.

Further, the method includes identifying an unseen object list by comparing i) a visible object list obtained from the egocentric view and ii) an object list of the plurality of objects created by the robotic agent in accordance with a user-specified tidy goal state.

Further, the method includes triggering a large language model (LLM) based search network to predict a probable receptacle for each unseen object from among the unseen object list, wherein the LLM based search network applies a two steps search technique comprising: (a) filtering out, via a sorting network (SRTN), a set of receptacles from an object-receptacle list generated during learning phase of the robotic agent list, wherein the filtering is in context of the unseen object list, wherein the filtered out set of receptacles belong to an implausible class; and (b) identifying a most probable receptacle for the unseen object based on a probability score metric computed by a Scoring Network (SCN); wherein the robotic agent assumes the position of the unseen object to be the position of its most probable receptacle from the object-receptacle list created by the robotic agent in accordance with a user-specified tidy goal state, and wherein the robotic agent replans the search based on one or more conditions experienced during task planning execution.

Furthermore, the method includes creating a graph embedding from the spatial graph representation of the untidy current state and the user-specified tidy goal state via a graph representation network (GRN), trained using an encoder and a decoder, to generate meaningful embeddings from the untidy current state and the user-specified tidy goal state graph that incorporates a residual relative path length notion between every pair of nodes associated with the untidy current state and the user-specified tidy goal state.

Furthermore, the method includes task planning for visual room rearrangement via a Parameterized Deep-Q Network (P-DQN) with hybrid action space comprising a discrete action, denoting an index of a selected unseen object or the probable receptacle, followed by a continuous parameter which signifies a location for object placement or receptacle search, wherein the P-DQN uses a proxy reward network trained with episodic reward, generated from the stepwise hierarchical dense reward and overall episodic path length. The graph embedding enables state space of the P-DQN to understand semantic and geometric information of the untidy current state and the user-specified tidy goal state It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles:

FIG. 2 is a flow diagram illustrating a method for task planning for visual room rearrangement under partial observability, using the system depicted in FIGS. 1A and 1B, in accordance with some embodiments of the present disclosure.

FIG. 3 is an example illustration for set up for rearrangement task to be performed by the robotic agent and initial egocentric view of the robotic agent in an untidy current state for the setup, in accordance with some embodiments of the present disclosure.

DETAILED DESCRIPTION

Figure 1A:
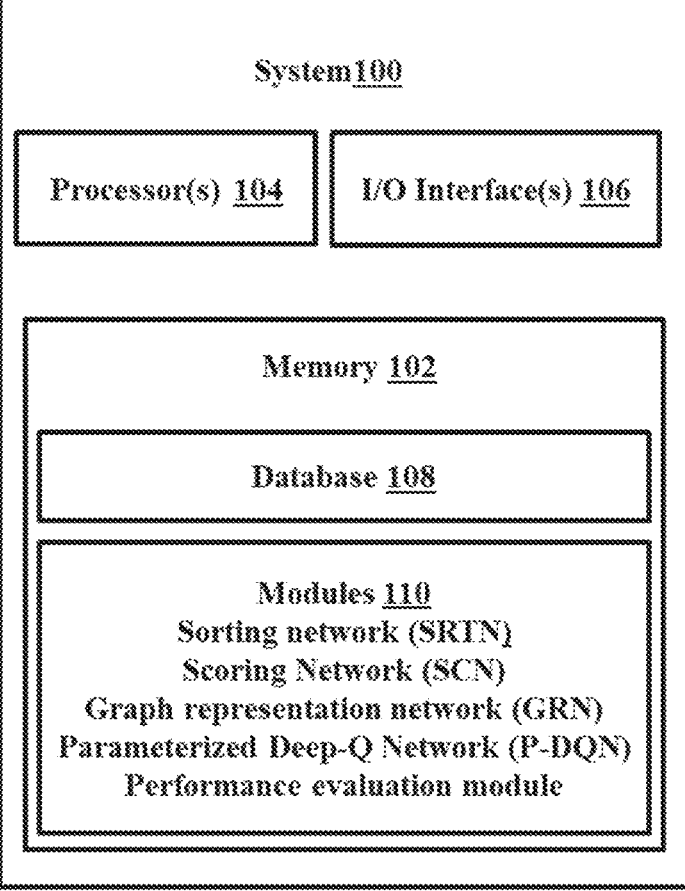
FIG. 1A is a functional block diagram of a system, also referred to as a robotic agent, for task planning for visual room rearrangement under partial observability, in accordance with some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

As seen in the background section, state of the art approaches hardly focus on minimizing overall agent traversal during the task planning in a room rearrangement problem. Further, the state representation is not scalable to large numbers of objects. Moreover, their reliance on the ground truth object positions in both the current and goal states is impractical in real-life. Thus, a more practical aspect of the room rearrangement problem through efficient task planning under partial observability of a room is needed.

In practical room set up, the task assigned to robotic agent for rearrangement has complex scenarios as depicted in FIG. 3. In FIG. 3, figure (a) shows the top down view of a rearrangement task and (b) is the agent's initial egocentric view in the untidy current state for the same setup. The solid 2D bounding boxes indicate the desired goal state for all objects, while the dashed ones show the initial positions of visible objects in the untidy current state. The dotted 2D bounding boxes represent initial positions of unseen objects in the untidy current state. The sponge (1), an unseen object, is in a drawer near the stove, while the tomato (2), another unseen object, is on a stool behind the countertop. There are two scenarios: a blocked goal case with the lettuce (3) and kettle (4) and a swap case between the bread (5) and pot (6).

As can be understood major challenges associated with efficient task planning for room rearrangement under partial observability, are (i) uncertainty over the location of unseen objects due to partial observability (objects outside the robotic agent's field of view presently which are visible from a different perspective, or objects placed within a closed receptacle e.g. spoon in drawer), (ii) scalability to a large number of objects, (iii) combinatorial expansion of sequencing due to simultaneous object search (for unseen objects) and rearrangement, (iv) minimizing the overall traversal by the agent during simultaneous object search and rearrangement (v) blocked goal and swap cases without explicit buffer.

Embodiments of the present disclosure provide a method and system for task planning for visual room rearrangement under partial observability. The system herein refers to a robotic agent trained for performing the assigned tasks. The robotic agent utilizes a visual input captured as an egocentric camera view to efficiently plan a sequence of actions for simultaneous object search and rearrangement in an untidy room, to achieve a desired tidy state. Unlike search networks in the art that follow ad hoc approach, the method discloses a search network that utilizes commonsense knowledge from large language models to find unseen objects. Further, a Deep Reinforcement Learning (Deep RL) network used for task planning is trained with proxy reward, along with unique graph-based state representation to produce a scalable and effective planner that interleaves object search and rearrangement to minimize the number of steps taken and overall traversal of the agent, as well as to resolve blocked goal and swap cases. Unlike uniform distribution approach used by existing reward functions that does not well suite challenges of object rearrangement problem, the method uses a sample efficient cluster-biased sampling for simultaneous training of the proxy reward network along with the Deep RL network.

Unlike state of the art metrics that focus on completeness of the task as performance indicator, the method discloses new metrics that measure the effectiveness of rearrangement planning Referring now to the drawings, and more particularly to FIGS. 1A through 5, where similar reference characters denote corresponding features consistently throughout the figures, there are shown preferred embodiments and these embodiments are described in the context of the following exemplary system and/or method.

FIG. 1A is a functional block diagram of a system 100, also referred to as a robotic agent, for task planning for visual room rearrangement under partial observability, in accordance with some embodiments of the present disclosure.

In an embodiment, the system 100 includes a processor(s) 104, communication interface device(s), alternatively referred as input/output (I/O) interface(s) 106, and one or more data storage devices or a memory 102 operatively coupled to the processor(s) 104. The system 100 with one or more hardware processors is configured to execute functions of one or more functional blocks of the system 100.

Referring to the components of system 100, in an embodiment, the processor(s) 104, can be one or more hardware processors 104. In an embodiment, the one or more hardware processors 104 can be implemented as one or more microprocessors, microcomputers, microcontrollers, digital signal processors, central processing units, state machines, logic circuitries, and/or any devices that manipulate signals based on operational instructions. Among other capabilities, the one or more hardware processors 104 are configured to fetch and execute computer-readable instructions stored in the memory 102. In an embodiment, the system 100 can be implemented in a variety of computing systems including laptop computers, notebooks, hand-held devices such as mobile phones, workstations, mainframe computers, servers, and the like.

The I/O interface(s) 106 can include a variety of software and hardware interfaces, for example, a web interface, a graphical user interface and the like and can facilitate multiple communications within a wide variety of networks N/W and protocol types, including wired networks, for example, LAN, cable, etc., and wireless networks, such as WLAN, cellular and the like. In an embodiment, the I/O interface (s) 106 can include one or more ports for connecting to a number of external devices or to another server or devices. A camera to capture egocentric view is mounted on the robotic agent and controlled by the one or more hardware processors through the I/O interface 106.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

In an embodiment, the memory 102 includes a plurality of modules 110 such as a large language model (LLM) based search network comprising a Sorting network (SRTN) and a Scoring Network (SCN), a Graph representation network (GRN) trained using an encoder and a decoder, a Parameterized Deep-Q Network (P-DQN) utilizing a proxy reward network trained with episodic reward, and a Performance evaluation module to evaluate new performance metrics.

Further, the plurality of modules 110 include programs or coded instructions that supplement applications or functions performed by the system 100 for executing different steps involved in the process of task planning for visual room rearrangement under partial observability, being performed by the system 100. The plurality of modules 110, amongst other things, can include routines, programs, objects, components, and data structures, which performs particular tasks or implement particular abstract data types. The plurality of modules 110 may also be used as, signal processor(s), node machine(s), logic circuitries, and/or any other device or component that manipulates signals based on operational instructions. Further, the plurality of modules 110 can be used by hardware, by computer-readable instructions executed by the one or more hardware processors 104, or by a combination thereof. The plurality of modules 110 can include various sub-modules (not shown).

Further, the memory 102 may comprise information pertaining to input(s)/output(s) of each step performed by the processor(s) 104 of the system 100 and methods of the present disclosure.

Further, the memory 102 includes a database 108. The database (or repository) 108 may include a plurality of abstracted pieces of code for refinement and data that is processed, received, or generated as a result of the execution of the plurality of modules in the module(s) 110.

Although the database 108 is shown internal to the system 100, it will be noted that, in alternate embodiments, the database 108 can also be implemented external to the system 100, and communicatively coupled to the system 100. The data contained within such an external database may be periodically updated. For example, new data may be added into the database (not shown in FIG. 1A) and/or existing data may be modified and/or non-useful data may be deleted from the database. In one example, the data may be stored in an external system, such as a Lightweight Directory Access Protocol (LDAP) directory and a Relational Database Management System (RDBMS). Functions of the components of the system 100 are now explained with reference to steps in flow diagrams in FIG. 1B through FIG. 5.

Figure 1B:
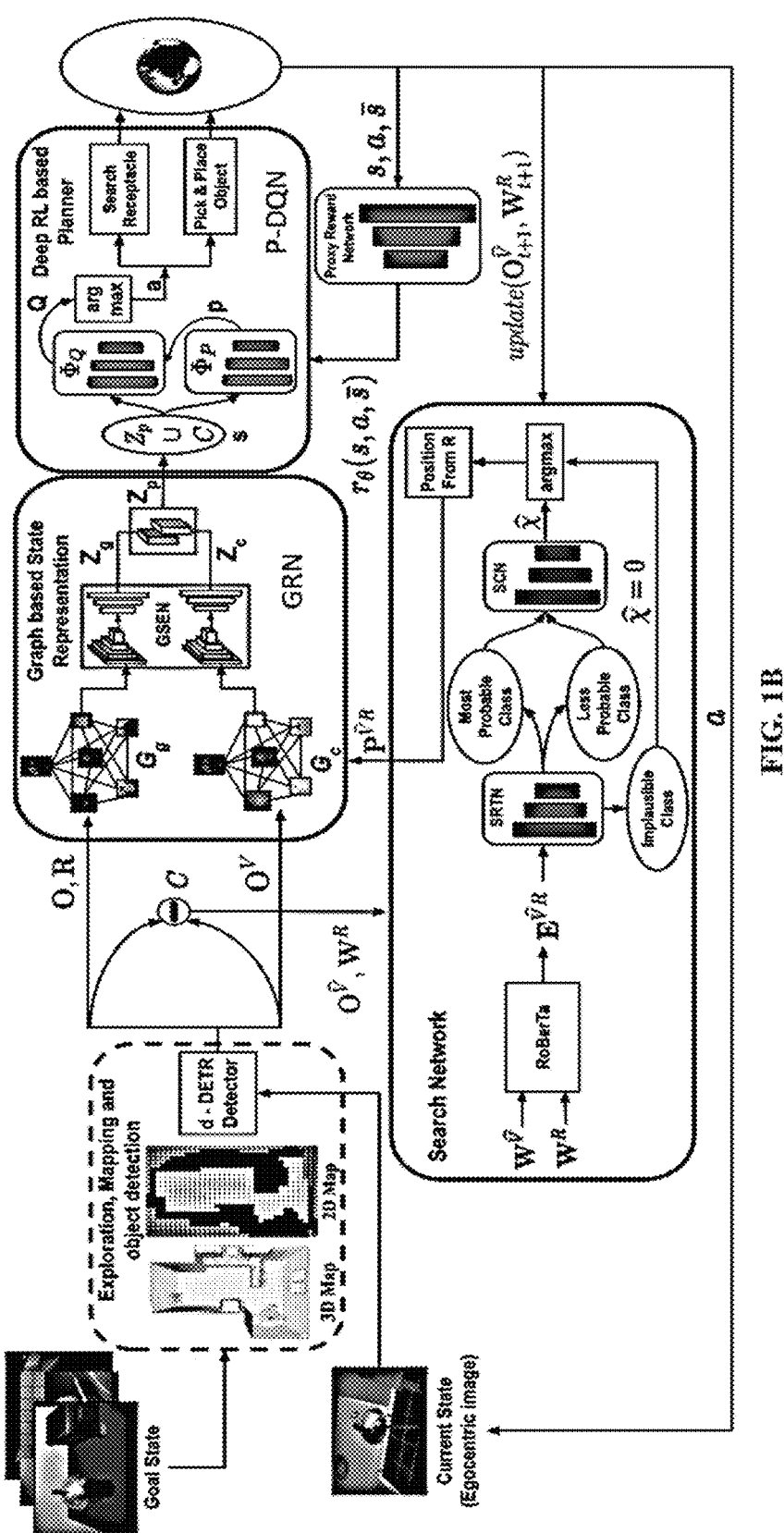
FIG. 1B illustrates an architectural overview of the system of FIG. 1A depicting hierarchical pipeline for task planning for visual room rearrangement under partial observability, in accordance with some embodiments of the present disclosure.

FIG. 1B illustrates an architectural overview of the system 100 of FIG. 1A depicting hierarchical pipeline for task planning for visual room rearrangement under partial observability, in accordance with some embodiments of the present disclosure.

At the beginning, the robotic agent 100 captures the goal state by exploring the room as depicted in FIG. 3(a) to record the semantic and the geometric configuration of objects and receptacles through egocentric perception. Once the goal state is captured, the objects in the room are shuffled. In the untidy current state, the robotic agent 100 partitions the task planning problem into two parts; (i) object search and (ii) task planning, with the aim of minimizing the overall agent traversal during simultaneous object search and rearrangement. First, the commonsense knowledge based Search Network using large language models (LLMs) leverages the object-receptacle semantics to predict the most probable receptacle for an unseen object in the ego-view. Second, the Deep RL (P-DQN) network with hybrid action space is used to plan action sequences for simultaneous object search and rearrangement by resolving blocked goal and the swap cases.

To this extent, the Deep RL state space is defined with a novel graph-based state representation for the current and the goal state that incorporates geometric information about objects. This representation compactly encodes the scene geometry that aids in rearrangement planning and makes the Deep RL state space scalable to a large number of objects and scene invariant. In addition, the sample-efficient cluster-biased sampling for simultaneous training of the proxy reward network and Deep RL to get a better estimate of the problem's true objective from the episodic reward than the dense reward. The judicious combination of all the aforementioned components effectively tackle the challenging combinatorial optimization problem in rearrangement that was mentioned with respect to room rearrangement task for objects in FIG. 3(a).

FIGS. 2A through 2C (collectively referred as FIG. 2) is a flow diagram illustrating a method 200 for task planning for visual room rearrangement under partial observability, using the system depicted in FIGS. 1A and 1B, in accordance with some embodiments of the present disclosure.

In an embodiment, the system 100 comprises one or more data storage devices or the memory 102 operatively coupled to the processor(s) 104 and is configured to store instructions for execution of steps of the method 200 by the processor(s) or one or more hardware processors 104. The steps of the method 200 of the present disclosure will now be explained with reference to the components or blocks of the system 100 as depicted in FIGS. 1A and 1B and the steps of flow diagram as depicted in FIG. 2. Although process steps, method steps, techniques or the like may be described in a sequential order, such processes, methods, and techniques may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

Prior to performing any assigned task, the robotic agent 100 or the system 100 learns the user-specified tidy goal state prior for visual room rearrangement by exploring the room, creating a two dimensional (2D) occupancy map for navigation of the agent, creating a 3D map to augment the detection of 3D object and 3D centroids of the receptacle to a fixed global reference frame, and generating an object-receptacle list with semantic labels and the 3D centroids.

The method steps 202 through 210 explain the process of task planning by the robotic agent for visual room rearrangement under partial observability. However, the steps are later described in conjunction with FIG. 1B using the mathematical representation, equations, and expression in conjunction with machine learning models of the robotic agent. As depicted in FIG. 1B, the machine learning modules include the SRTN of the LLM based search network comprising a fully connected Multi-Layer Perceptron (MLP) trained using a cross entropy loss function ($L_{CE}$). Also, depicted is the SCN of the LLM based search network comprising a fully connected MLP trained using a mean of squared errors (MSE) loss function ($L_{MSE}$). Further, the GRN creates a graph embedding from the spatial graph representation. The GRN is trained using the encoder such as a Graph Siamese Encoder Network (GSEN) and the decoder of the GRN such as a Residual Geodesic Distance Network (RGDN). The P-DQN, which is a Deep Reinforcement Learning (Deep RL) based planner is trained via a proxy reward network that uses a cluster-biased return reward decomposition enabling reward distribution in an episode.

Referring to the steps of the method 200, at step 202 of the method 200, the one or more hardware processors 104 processing the actions of the robotic agent 100 are configured by the instructions to capture an egocentric view of a room in an untidy current state comprising one or more objects among a plurality of objects in the room misplaced from associated receptacles, wherein the robotic agent is currently at a random location in the room with partial observability of the room.

At step 204 of the method 200, the one or more hardware processors 104 controlling the actions of the robotic agent 100 are configured by the instructions to identify an unseen object list by comparing i) a visible object list obtained from the egocentric view and ii) an object list of the plurality of objects created by the robotic agent in accordance with a user-specified tidy goal state;

At step 206 of the method 200, the one or more hardware processors 104 controlling the actions of the robotic agent 100 are configured by the instructions to trigger a large language model (LLM) based search network as depicted in FIG. 1B. The search network predicts a probable receptacle for each unseen object from among the unseen object list. The LLM based search network applies a two steps search technique.

Firstly, the SRTN, filters a set of receptacles from the object-receptacle list in context of the unseen object list, wherein the filtered out set of receptacles belong to an implausible class as depicted in FIG. 1B.

Figure 4:
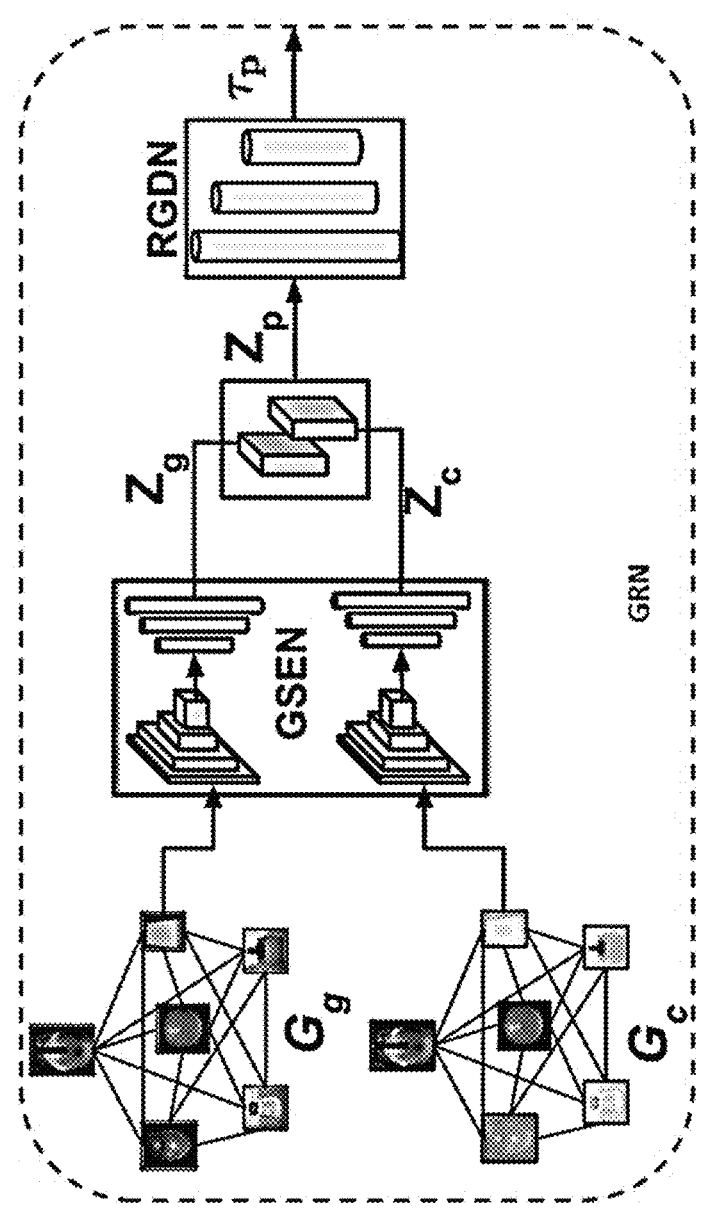
FIG. 4 depicts a block diagram of a Graph Representation Network (GRN), in accordance with some embodiments of the present disclosure.

Secondly, the robotic agent identifies the most probable receptacle for the unseen object based on a probability score metric computed by the SCN. Thus, the robotic agent 100 assumes the position of the unseen object to be the position of its most probable receptacle from the object-receptacle list created by the robotic agent in accordance with a user-specified tidy goal state, and wherein the robotic agent replans the search based on one or more conditions experienced during task planning execution;

At step 208 of the method 200, the one or more hardware processors 104 controlling the actions of the robotic agent 100 are configured by the instructions to create a graph embedding from the spatial graph representation of the untidy current state and the user-specified tidy goal state via the GRN. As depicted in FIG. 4, the GRN is trained using the encoder and the decoder, to generate meaningful embeddings from the untidy current state and the user-specified tidy goal state graph that incorporates a residual relative path length notion between every pair of nodes associated with the untidy current state and the user-specified tidy goal state.

At step 210 of the method 200, the one or more hardware processors 104 controlling the actions of the robotic agent 100 are configured by the instructions to perform task planning for visual room rearrangement via the P-DQN. The graph embedding enables state space of the P-DQN to understand semantic and geometric information of the untidy current state and the user-specified tidy goal state In practical room set up, the task assigned to robotic agent for rearrangement has complex scenarios as depicted in FIG. 3. In FIG. 3, figure (a) shows the top down view of a rearrangement task and FIG. 3 subfigure (b) is the agent's initial egocentric view in the untidy current state for the same setup. The solid 2D bounding boxes indicate the desired goal state for all objects, while the dashed ones show the initial positions of visible objects in the untidy current state. The dotted 2D bounding boxes represent initial positions of unseen objects in the untidy current state. The sponge (1), an unseen object, is in a drawer near the stove, while the tomato (2), another unseen object, is on a stool behind the countertop. There are two scenarios: a blocked goal case with the lettuce (3) and kettle (4) and a swap case between the bread (5) and pot (6).

The P-DQN works with hybrid action space comprising a discrete action, denoting an index of a selected unseen object or the probable receptacle, followed by a continuous parameter which signifies a location for object placement or receptacle search. The P-DQN uses the proxy reward network trained with episodic reward, generated from the stepwise hierarchical dense reward and overall episodic path length. The technical advancement provided by the disclosed proxy reward approach are further explained in comparison with performance state of the art rewards, as explained in FIG. 5.

The performance of the robotic agent in the task planning for visual room rearrangement is evaluated by the performance evaluation module in terms of efficiency of agent traversal using a plurality of metrics comprising:

1) Success measured by the inverse Number of Steps (SNS) that utilizes uses a binary success rate to evaluate the successful completion of a rearrangement episode along with a number of steps taken by the robotic agent to rearrange a given number of objects.

2) Efficiency in Number of Re-plans (ENR) during object search by taking the ratio of the number of unseen objects initially with respect to the number of attempts to search.

3) Absolute Traversal Cost (ATC) indicating overall distance traversed by the robotic agent during the successful completion of a rearrangement episode.

The architecture of the robotic agent 100 disclosed herein in FIG. 1B is explained below with help of mathematical models, equations, and expressions.

Mathematical representation, equations, and expression in conjunction with machine learning models of the robotic agent for task planning for visual room rearrangement under partial observability.

Referring to FIG. 3 subfigure (a), in the room-rearrangement setup, the agent explores the room to capture the tidy user-specified goal state. Durin this exploration, the robotic agent 100 creates a 2D occupancy map $M^{2D}$ for the robotic agent 100 navigation while, 3D map M3D is utilized to augment the detection of 3D object and receptacle centroids to a fixed global reference frame ($\mathbb{R}^3$). Additionally, an object list O={[$W_i$,$P_i$],i=1,2, . . . ,N} and a receptacle list $$R = \left\{ \left[ W_i^R, P_i^R \right], i = 1, 2, \dots, N_R \right\}$$

is generated. Here, N, Wand P $\in \mathbb{R}^3$ are the total numbers of objects, their semantic labels, and 3D object centroids, respectively. While $N_R$, $W^R$ and $P^R \in \mathbb{R}^3$ are the total numbers of receptacles, their semantic labels including the room name from Eric et.al. AI2-THOR: An Interactive 3D Environment for Visual AI. arXiv, 2017, and the 3D receptacle centroids, respectively. Few objects from the goal state are randomly shuffled to make the room untidy and fork the agent at a random location in the room. In this untidy current state, knowledge of the robotic agent 100 is limited to the visible part of the room in its egocentric view as can be seen in the example of FIG. 3 subfigure (b). In the agent's egocentric perception, only a set of objects $$O^V = \left\{ \left[ W_i^V, P_i^V \right], i = 1, 2, \dots, N_V \right\}$$

are visible. $N_V$, $W^V$ and $P^V \in \mathbb{R}^3$ are the number of visible objects, their semantic labels, and their 3D object centroids respectively in the current state. Comparing O in the goal state with $O^V$ in the current state allows for determining only the semantics of unseen objects $O^{\hat{V}}$={[W$\hat{V}_i$,i=1,2, . . . ,$N_{\hat{v}}$}, where $N_{\hat{V}}$ is the number of unseen objects and $W_{\hat{V}}$ their semantic labels. To plan efficiently and achieve the goal state, the robotic agent 100 must know the positions of all objects in the current state. This involves optimizing the search for unseen objects based on the object-receptacle semantics and simultaneously rearranging visible objects based on their positions in the current and goal state. To this end, a hierarchical method for task planner, as shown in FIG. 1B, with: (i) Search network, (ii) Graph-based state representation, (iii) Deep RL network trained with proxy reward. The objective of the task planner is to minimize the number of steps and the robotic agent's 100 overall traversal by simultaneously sequencing high-level actions to either pick-place misplaced objects or search for unseen objects at predicted receptacles.

As mentioned earlier, the robotic agent 100 agent maps the room (say for example room in FIG. 3(*a*) in the goal state using an known in the art exploration strategy such as provided by G Sarch et.al. in Tidying up novel rooms using visuo-semantic commonsense priors in European Conference on Computer Vision. The robotic agent or the agent 100 receives RGB-D images and egomotion information at each step from the Ai2Thor mentioned earlier. The agent 100 constructsM$^{2D}$ andM$^{3D}$ of the environment using the RGB-D input and egomotion. A detector, for example as in d-DETR detector Xizhou Zhu et.al. in Deformable DETR: deformable transformers for end-to-end object detection, is used on the RGB images to obtain 2D bounding boxes and semantic labels for objects and receptacles, and the corresponding 3D centroids are obtained using depth input, camera intrinsic and extrinsic. Finally, the agent 100 has O, R,M$^{2D}$,and M$^{3D}$ from the goal state. In the current state, the agent uses the d-DETR detector along with M$^{3D}$ to obtain $O^V$. The agent uses the well-known in art Djikstra path planner on M$^{2D}$ to navigate and execute high-level actions by assuming perfect motion and manipulation capabilities.

The LLM based search network (search network): The LLM-based Search Network to reliably predict the receptacles for $O^{\hat{V}}$. In case the predicted receptacle is articulated, the agent 100 opens it and looks for the object. The agent uses the predicted receptacle's position from the goal state to be the probable location for $O^{\hat{V}}$ in the current state since receptacles are static in the room. To this end, the common-sense knowledge is exploited in LLM to learn the semantic relationship between $O^{\hat{V}}$ and R. The search network consists of two parts: the Sorting Network(SRTN) and the Scoring Network (SCN). In an example implementation a RoBERTa-Large model known in the art is used to generate pairwise embeddings $$\left( E^{\hat{V}R} \right) \text{ for } \left\{ W_i^{\hat{V}} \right\} i = 1, 2, \dots, N_{\hat{V}} \text{ and } \left\{ W_i^R \right\} i = 1, 2, \dots, N_R$$

in the current state. Therefore, there are $N_{\hat{R}}$=$N_{\hat{V}} \times N_R$ number of embeddings for all the object room-receptacle (ORR) pairs, also referred to as object room-receptacle list. Each ORR embedding is classified into one of the 3 classes, based on the probability{$p_i$}i=1,2,3 from the Sorting Network. The ground truth class labels {$Y_i$}i=1,2,3 for each ORR in the dataset referred to in the experiments section is based on the probability to find an object at that room-receptacle, where {i=1: Most Probable Class, 2: Less Probable Class, 3: Implausible Class}. The SRTN filters out the room-receptacles, where there is a negligible chance of finding the misplaced object. For instance, even in an untidy room, it is nearly impossible to find a cup in the bathtub of a bathroom. This sorting step reduces the scoring network's computation and minimizes the chances of erroneous scoring of an implausible ORR. The fully connected MLP in SRTN is trained using the Cross-Entropy Loss ($L_{CE}$) as shown in Eq. (1). The Scoring Network estimates probability scores {$\hat{X}_i$}i=1,2, . . . N$_{SR}$ for embeddings of higher probability classes, with $N_{SR}$ representing the total number of such embeddings. SCN provides a probability score metric, to choose the most probable receptacle for $O^{\hat{V}}$. For training the fully connected MLP in SCN, the MSE Loss ($L_{MSE}$) of probability scores id calculated, as in Eq. (2), with respect to the ground truth probability scores {$X_i$}i=1,2, . . . N$_{SR}$. Finally, the position $$\left( \left\{ P_i^{\hat{V}R} \right\} i = 1, \dots N_{\hat{V}} \right)$$

of the unseen objects as the position of their most probable receptacle.

$$L_{CE} = -\frac{1}{N_E} \sum^{N_E} \sum_{i=1}^{3} Y_i \log p_i \tag{1}$$

-continued $$L_{MSE} = \frac{1}{N_{SR}} \sum_{i=1}^{N_{SR}} \left( \hat{X}_i - X_i \right)^2 \tag{2}$$

To prevent fruitless searches, simple strategies are implemented. If the agent cannot find the unseen object at the predicted receptacle, the Search Network identifies the next most probable room-receptacle, and the prior prediction is discarded before re-planning a new sequence. Additionally, if the agent encounters a receptacle on its path that does not contain any unseen objects, it is removed from future searches. The agent updates $O^{\hat{V}}$ whenever it detects an unseen object in its ego-view. If the agent 100 locates the unseen object it is searching for before arriving at the predicted receptacle, it updates $O^{\hat{V}}$ and re-plans a new sequence.

Graph-Based State Representation—GRN: For the task planning algorithm, a spatial graph (G={V,E}) representation of the current state (refers to untidy current state) and the goal state (refers to user-specified tidy goal state) namely $$G_C = \left\{ P_i^{\hat{V}R}, E_C \right\} \text{ and } G_g = \{V_g, E_g\}$$

respectively is created. The nodes $V_C=\{O^V\}$ and $V_g=\{0\}$. The fully connected edges of the graph contain the path-length as edge features, where $$E_C = \left\{ \mathcal{D}\left( P_i^V, P_j^V \right) i \neq j \right\} \text{ and } E_g \{ \mathcal{D}(P_i, P_j) i \neq j \}.$$

The path length $\mathcal{D}(A_i, A_j) i \neq j$ is the length of the shortest collision free path, computed using the Djikstra, between the 2D projections of $A_i, A_j \in \mathbb{R}^3$ on $M^{2D}$. For unseen objects in the current state, the object nodes and edges in $G_C$ are augmented with $P^{\hat{V}R}$ from the search network as $V_C = V_C$ $U\{O^V, P^{\hat{V}R}\}$ and $E_C = \mathcal{D}(\bar{P}_i, \bar{P}_j) i \neq j\}$, where $\bar{P}=P^V$ U $P^{\hat{V}R}$ This graph representation helps the Deep RL state space to understand the semantic and geometric information of the current and the goal state. As mentioned earlier a new Graph Representation Network (GRN) with the encoder-decoder is used to generate meaningful embeddings from $G_C$ and $G_g$ for Deep RL state space to incorporate the residual relative path length notion between every pair of current and goal state nodes. The GRN consists of two major blocks, the Graph Siamese Encoder Network (GSEN) and the Residual Geodesic Distance Network (RGDN) as shown in FIG. 4. GSEN uses a Graph Convolution Network known in the art to encode the graphs $G_C$ and $G_g$ and produce the graph embeddings $Z_C$ and $Z_y$ respectively. These graph embeddings are concatenated to get the final embeddings $Z_P=Z_C u Z_g$. The RGDN acts as the decoder and predicts the residual relative path length $\tau_p$ between the two graphs. This network is trained in a supervised way as in Eq. (3), using the Graph Dataset provided under the experiment section, which contains the ground truth relative path length (T) between the two graphs. This graph embedding makes the Deep RL state space invariant to a large number of objects and the scene. This compact representation concisely encodes the pairwise distance between the source and target nodes which aids in the reduction of the combinatorial expansion of rearrangement sequencing.

$$\tau_p = GRN(G_c, G_g) \tag{3}$$

$$L_{GRN} = \| \tau - \tau_p \|^2$$

Deep RL based Planner (P-DON): The task planner needs to select the objects or the probable receptacles for the unseen objects in an efficient manner, to minimize the overall traversal of the agent to simultaneously search the unseen objects and rearrange the visible ones. Moreover, the planner needs to identify free locations when selecting objects with swap cases. In order to achieve the aforementioned goals, the Parameterized Deep-Q Network is implemented with hybrid action space similar to that proposed by (Ghost et.al): Sourav Ghosh, Dipanjan Das, Abhishek Chakraborty, Marichi Agarwal, and Brojeshwar Bhowmick in Planning large-scale object rearrangement using deep reinforcement learning in 2022 International Joint Conference on Neural Networks (IJCNN. A binary Collision vector $(C_{N \times 1})$ is defined that signifies the objects with a blocked goal or swap case. The Deep RL state space defined as $s=Z_p$ u C. Each action $\{a_i=(k,p_k)\}$ in the sequence of actions $\{a_i\}i=1,2,\ldots,K$ of length K is made up of a discrete action k, denoting the index of the selected object or the probable receptacle, followed by a continuous parameter $P_k$ which signifies the location for object placement or receptacle search.

A parameter network $(\phi_p)$ and the Q-network $(\phi_Q)$ is used to generate a continuous parameter $P_k$ and a discrete action k respectively, similar to Ghosh et al. mentioned above. According to a Markov Decision Process (MDP), the method receives a reward r(s, a) at each time step t, for choosing an action a, which advances the agent from the current state 's' to the next state $\bar{s}$. Inspired by the work of Ghosh et.al, the Q values are defined as a function of the joint continuous action parameter $p=[p_k]k=1,2,..,K$ instead of updating the Q-values with its corresponding continuous parameter sample pk. The modified Bellman equation is shown in Eq. (4). This prevents the robotic agent 100 from producing degenerate solutions by incorporating the effect of other parameters for updating the Q-values.

$$Q(s, k, p) = \frac{E}{r, \bar{s}} \left[ r + \frac{\gamma max Q}{\bar{k} \in k} \left( \bar{s}, \bar{k}, \Phi_p(\bar{s}) \right) | s, k, p \right] \tag{4}$$

The loss function $L_p(\phi_p)$ and $L_Q(\phi_Q)$ for the parameter network(Op) and the Q network($\phi_Q$), is given by Eq. (5)

$$L_p(\Phi_p) = - \sum^{R_B} \sum_{k=1}^{K} Q(s, k, \Phi_p(s); \Phi_Q) \tag{5}$$

$$L_Q(\Phi_Q) = \frac{E}{(s, k, p, r, \bar{s}) \leftarrow R_B} \left[ \frac{1}{2} (y - Q(s, k, p; \Phi_Q))^2 \right]$$

Here, $y=r+ymax_{k \in K}Q(\bar{s}, \bar{k}, \bar{p}s; \phi_p); \phi_Q)$ is the updated target from Eq. (4) and RB is the replay buffer. $L_p(\phi_p)$ indicates how the p must be updated to increase the Q-values. Here $\phi_Q$ works as critic to $\phi_p$.

It can be observed that for Long Horizon planning, the sparse reward is not sampling efficient for training the Deep RL. Hence, the robotic agent applies a process of stepwise environmental feedback based on the hierarchical dense reward similar to the Ghosh et al. This reward structure consists of the (i) Infeasible action reward for penalizing the agent for taking a non-realizable action, (ii) Static action reward for preventing the agent from taking redundant moves, (iii) Nearest neighbor reward to ensure that the agent chooses the nearest objects for rearrangement and (iv) Goal reaching reward to penalize the residual distance of the agent from the goal.

To this existing reward structure, the method appends the Receptacle Reaching Reward—to ensure that the agent reaches the predicted receptacle location for the unseen objects, and modified Collision resolution reward—for prioritizing the selection of buffer space for a swap case object along with minimizing overall agent traversal. This reward structure provides per step feedback, but the required is episodic reward-based feedback to improve RL policy generalization. Thus, for every episode ($\Lambda$), the episodic reward (Rep) is calculated using the stepwise hierarchical dense reward (r) and overall episodic path length (L) as in Eq. (6), and save the reward and each step (s, a, $\bar{s}$) of the episode into the replay buffer (RB). As this episodic reward is sparse, the proxy reward network is used to generate per-step dense Markovian reward with an episodic notion.

Proxy Reward Network: The proxy reward network disclosed herein is trained on the sampled experience data from the replay buffer, to give the agent 100 a notion of the overall objective of the episode.

The random return decomposition (RRD) method used in Zhizhou Ren et.al., Learning long-term reward redistribution via randomized return decomposition, trains a proxy reward network by randomly sampling steps from an episode. This training method is not sample efficient because it uniformly samples the steps without considering the reward distribution in the episode. To this end, the method disclosed herein provides cluster-biased return reward decomposition (CB-RD) to train our proxy reward network. The per-step reward for the episode is clustered into 3 clusters each of size $T_j$, where j ∈ {1, 2, 3}, using the c-means clustering. These clusters represent the reward distribution in an episode. This information helps to efficiently sample $N_s$ number of steps from the episode.

Randomly sampling is performed such that $$U_j = \{(s_{ij}, a_{ij}, \overline{s_{IJ}})\}_{i=1}^{N_j}$$

from each cluster j, such that $N_j = N_s \times T_j/N_{ep}$. Using {Uj}j=1, 2,3, the learned episodic reward ($R_{ep}$, θ) is estimated from the proxy reward network $r_\theta(s, a, \bar{s})$, where θ is the learned weight.

$$R_{ep} = \frac{N_{ep}}{L} \sum_{i=1}^{N_{ep}} r_i \quad (6)$$

$$R_{ep,\theta} = \sum_{j=1}^{3} p_j \frac{T_j}{N_j} \sum_{i=1}^{N_j} r_\theta(s_{i,j}, a_{i,j}, \overline{s_{i,j}}) \quad (7)$$

$$L_{CBRD} = \frac{1}{M} \sum_{i=1}^{M} \left[ \left(R_{ep_i} - R_{ep,\theta_i}\right)^2 \right] \quad (8)$$

Figure 5:
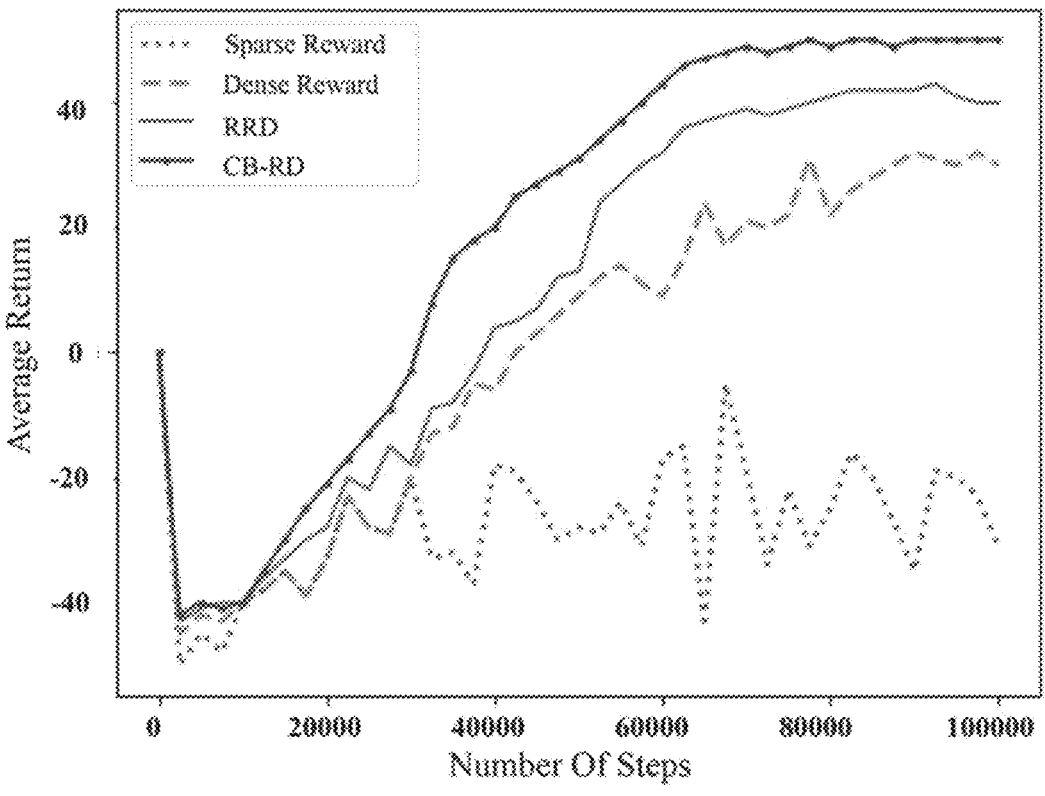
FIG. 5 is a graph depicting comparison of a proxy reward network used to train a Parameterized Deep-Q Network (P-DQN) implemented by the robotic agent against rewards in the state of the art, in accordance with some embodiments of the present disclosure It should be appreciated by those skilled in the art that any block diagrams herein represent conceptual views of illustrative systems and devices embodying the principles of the present subject matter. Similarly, it will be appreciated that any flow charts, flow diagrams, and the like represent various processes which may be substantially represented in computer readable medium and so executed by a computer or processor, whether or not such computer or processor is explicitly shown.

Here, M is the number of episodes sampled, $N_{ep}$ is the number of steps in an episode and $p_j = T_j/N_{ep}$ is the uniform probability of choosing a sample from the episode that belongs to cluster j. Deep RL (P-DQN) is simultaneously using Eq. (5) and proxy reward network using Eq. (8) as shown in Pseudocode 1. FIG. 5 shows that CB-RD provides effective feedback to the Deep RL based method to achieve a higher average return in a lesser number of steps during training. Hence CB-RD makes the Deep RL method (P-DQB based method) more sample efficient compared to the RRD, hierarchical dense reward, and the sparse reward.

An off-policy approach is used with a replay buffer to train the Deep RL or the P-DQN with a diverse set of rearrangement configurations, similar to the work proposed by Dmitry Kalashnikov et.al, Qtopt: Scalable deep reinforcement learning for vision-based robotic manipulation. A ∈ greedy method well known in the art is used to strike a balance between exploration and exploitation. The Deep RL training is stabilized using target networks for φQ and φp, and the weights of target networks are updated using Timothy P Lillicrap et.al., Continuous control with deep reinforcement learning. Averaging similar to Craig J Bester, Steven D James, and George D Konidaris, Multi-pass q-networks for deep reinforcement learning with parameterized action spaces is used. An ablation study shows that the selection of E has a significant impact on the solution.

Pseudocode 1: Training Proxy Reward Network

1 Initialize $R_B$←{ };
    2 for i←0, 1, 2, . . . do
    3 Using E-greedy, rollout episode $A_i$;
    4 Calculate episodic reward $R_{epi}$ using Eq. (6);
    $R_B$←$R_B$ U {$A_i$, $R_{epi}$};
    5 for I←0, 1, 2, . . . do
    6

$$\text{Sample } M \text{ episodes } \{A_l \in RB\}_{l=1}^{M};$$

7 Group steps from each episode into j ∈ {1, 2, 3} clusters based on r;
    8 Cluster Biased Sampling to get $U_{ij}$ from $A_l$;
    9 Compute $R_{ep}$, θ using Eq. (7);
    10 Calculate $L_{CBRD}$ as in Eq. (8);
    11 θ←θ-a∇θ$L_{CBRD}$, with learning rate a;
    12 Optimize the policy $φ_Q$ using $r_\theta(s,a)$, and Eq. (5);

Experiments

Dataset: The Graph Dataset is generated to train GRN using the Ai2Thor, by randomly placing objects for two types of rearrangement scenarios: (i) 40% without goal occupied rearrangement: by placing the objects in free spaces and (ii) goal occupied rearrangement: by placing the object in another object's target location.

Search Network Dataset: This comprises the publicly available AMT dataset that contains 268 object categories in 12 different rooms and 32 receptacle types. Each object-room-receptacle (ORR) pair is ranked by 10 annotators in 3 classes: correct (positively ranked), misplaced (negatively ranked), and implausible (not ranked). For the problem statement herein, the misplaced class is of utmost importance. Hence, the classes are renamed as (i) misplaced class→ most probable class, (ii) correct class→ less probable class, and (iii) implausible class remains the same. The ground truth score values for each ORR are found as the mean inverse of the ranks.

Benchmark Dataset for Testing: The existing benchmark dataset, RoomR, evaluates rearrangement policies in different scenarios. However, it has limitations as it only allows up to 5 objects, no object placement within another receptacle, and no blocked goal or swap cases. Thus, it cannot fully evaluate planning aspects such as the number of steps taken, agent traversal, blocked goal, or swap cases. To address this, a new benchmark dataset RoPOR is introduced for testing task planners in Ai2Thor. It includes a diverse range of rooms (120) and object-receptacle pairs (118), allowing for a wide variety of rearrangement scenarios with up to 20 objects and random partial observability cases, object placement within receptacles in the current state, and blocked goal and swap cases. Moreover, object placement configurations in RoPOR affect sub-optimal planning policies in terms of agent traversal. The mean room dimensions along x-axis and y-axis are 3.12 m and 5.80 m, respectively.

Metrics: Existing metrics do not highlight the efficacy of a task planner to judge efficient sequencing to reduce the number of steps taken or the agent traversal during rearrangement. For a fair evaluation of system (robotic agent) 100 and the method 200 and, and comparison against the existing methods and ablations, new metrics are disclosed:

1) SNS: Success measured by the inverse Number of Steps uses a binary success rate (S) to evaluate the successful completion of a rearrangement episode along with the number of steps ($N_T$) taken by an agent to rearrange a given number of objects (N). S is 1 if all object positions in the current and goal state are approximately equal. The higher the SNS implies the lower $N_T$ for a given N, indicating a more efficient and successful rearrangement episode. ($SNS = S \times N/N_T$)

2) Efficiency in Number of Re-plans ENR: ENR during object search by taking the ratio of the number of unseen objects initially ($N_{\bar{v}}$) with respect to the number of attempts to search ($N_{s\bar{v}}$). A higher ENR shows a lower $N_{s\bar{v}}$ for a given $N_{\bar{v}}$ indicating a more efficient search to find unseen objects. ($ENR = N_{\bar{v}}/N_{s\bar{v}}$)

Absolute Traversal Cost(ATC): The metric shows the overall distance traversed by the agent during the successful completion of a rearrangement episode. In an identical test configuration, a lower ATC indicates a more efficient rearrangement sequencing.

Ablation: The method for task planning disclosed herein is ablated against ground-truth perception, various methods for object search and a dense reward structure. To study the effect of erroneous perception on the method disclosed for task planning, it is assumed that there is availability of Ground-Truth object detection labelling and 3D centroid localization from Ai2Thor. To understand the importance of the disclosed LLM based 2 step Search Network in task planning, the LLM based search network is replaced by known in the art (i) Random Search policy, which predicts probable receptacles for unseen objects with uniform probability and a (ii) Greedy Exploration strategy that optimizes for map coverage to discover all the unseen objects. To highlight the generalization of the proxy reward network to the overall objective of the rearrangement episode, the proxy reward is replaced with a hierarchical Dense Reward structure as in Ghosh. et.al. Concretely, comparison is done against following ablated methods:

M200-GT: Method 200 (M-200) with Ground-Truth perception.

M200-RS: M200 with Random Search policy.

M200-GE: M200 with Greedy Exploration.

M200-DR: M200 with Dense Reward.

The ablation study highlights the judicious design choices for each of our method components. The search ablation highlights the improvement over the random search and exploration baselines in terms of the ENR metric. Similarly, the dense reward ablation emphasizes the performance gain obtained by using the proxy reward in terms of the ATC metric.

Moreover, the choice of hyper parameters as picked by the method is decisively determined by the ablation of different RoBERTa embeddings, pre-training of graph, the impact of epsilon value in RL training and the selection of number of clusters for proxy reward training.

Quantitative Results: The method 200 implemented by the robotic agent 100 is evaluated along with the existing methods on RoPOR-Benchmark Dataset in Ai2Thor. Table 1 below indicates that M200 is scalable to large number of objects, as demonstrated by the consistent value of SNS despite the increasing number of objects across complete visibility, partial observability, and swap cases without an explicit buffer. The gradual increase in ENR with the increase in number of objects can be attributed to the fact that rearrangement of visible objects and the search for some unseen objects indirectly aids in finding other unseen objects. M200 is further compared to previous works such as Weihs et al. Visual room rearrangement., Gadre et al. Continuous scene representations for embodied ai, Sarch et al. Tidying up novel rooms using visuo-semantic commonsense priors and Ghosh et al., all of which have demonstrated results for a user specific room-rearrangement. For a fair comparison with Weihs et al., their best performing model RN18+ANM, PPO+IL is used. Since, Ghosh et al., uses ground truth object positions in the current and the goal state, it is compared it with the ablation method M200-GT. Without erroneous perception, M200-GT demonstrates efficient planning, by performing significantly better than all the existing methods, including M200, in terms of SNR, ENR and ATC. Under complete visibility, M200 significantly outperforms Weihs et al., Gadre et al. and Sarch et al. in terms of SNS and ATC. Similarly, M200-GT significantly outperforms Ghosh et al. in terms of ATC. The improvement over Weihs et al., Gadre et al. and Sarch et al. shows their heuristic planner is neither scalable nor does it optimize the overall agent traversal or the number of rearrangement steps. In contrast, M200 leverages compact graph based scene geometry capable of addressing large numbers of objects, and robust Deep RL makes our planner efficient in reducing the redundant traversal of the agent. M200 uses path length cost and proxy reward with the episodic notion, which helps to improve the overall traversal of the agent to produce lower ATC. In comparison, Ghosh et al. uses greedy Euclidean distance based reward without having an episodic notion, thus failing to optimize overall traversal. Moreover, Ghosh et al. shows a drop in performance on the RoPOR dataset as compared to their results evaluated on RoomR, due to the variations in the testing scenarios in RoPOR that significantly impact agent traversal for sub-optimal rearrangement policies. Under partial observability, there are two cases—(i) OOF: Objects located outside the field of view initially which are visible from a different perspective and (ii) OPR: Objects placed inside closed receptacles. In the case of OOF, M200 substantially outperforms Weihs et al., Gadre et al. and Sarch et al. in terms of SNS, ENR and ATC. All these above methods use greedy sub-optimal planners and employ explicit scene exploration to find objects outside the field of view, incurring huge traversal cost as indicated by their ATC. To gauge the performance of the exploration strategy for object search in terms of ENR, each newly generated location or a set of navigational steps is considered from the exploration policy as a search attempt.

M200's significantly higher ENR shows that the Search Network outperforms the exploration policies of the existing methods mentioned above in terms of the number of attempts to find unseen objects. Ghosh et al. does not address any case of partial observability. While Weihs et al., Gadre et al. and Sarch et al. do not solve the case of OPR, which involves object placement inside receptacles (SNS=0).

However, M200 performs equally well in both cases of partial observability due to the disclosed search network's ability to comprehend a commonsense based semantic relationship between an object and any type of receptacle—rigid or articulated. Swap cases without an explicit buffer, are not handled by Weihs et al., Gadre et al. and Sarch et al., which is evident from SNS=0. M200-GT and Ghosh et al. can effectively resolve an increasing number of swap cases without an explicit buffer using the hybrid action space in the Deep RL network. However, M200-GT performs better than Ghosh et al. in terms of ATC due to a novel collision resolution reward that optimizes the agent's traversal.

Further, the Deep RL based planner (P-DQN) is trained with proxy reward to overcome combinatorial expansion in rearrangement sequencing and, to optimize the overall agent traversal and the number of steps taken. A new Graph-based state representation for the current and goal state to include geometric information about objects, making the Deep RL state space scalable to large numbers of objects and scene-invariant. A new sample-efficient cluster biased sampling for simultaneous training of the proxy reward network and the Deep RL network. A new set of metrics are disclosed to obtain a thorough assessment of the rearrangement planner's effectiveness by not only evaluating the success of the

TABLE 1

| Number of Objects | Visible Objects | Unseen Objects OOF | Unseen Objects OPR | Swap Case | M200-GT SNS↑ | M200-GT ENR↑ | M200-GT ATC(m) | M200 SNS↑ | M200 ENR↑ | M200 ATC(m) | Weihs et al. SNS↑ | Weihs et al. ENR↑ | Weihs et al. ATC(m) |
|---|---|---|---|---|---|---|---|---|---|---|---|---|---|
| 5 | 5 | 0 | 0 | 0 | 0.98 | NC | 10.57 | 0.74 | NC | 11.98 | 0.018 | NC | 18.11 |
|  | 5 | 0 | 0 | 2 | 0.70 | NC | 12.36 | 0.53 | NC | 13.46 | 0 | NC | NC |
|  | 3 | 2 | 0 | 0 | 0.81 | 0.61 | 12.93 | 0.60 | 0.48 | 14.33 | 0.002 | 0.17 | 19.46 |
|  | 3 | 0 | 2 | 0 | 0.79 | 0.60 | 13.39 | 0.58 | 0.47 | 14.89 | 0 | NC | NC |
| 10 | 10 | 0 | 0 | 0 | 0.97 | NC | 22.19 | 0.73 | NC | 24.51 | 0.002 | NC | 34.05 |
|  | 10 | 0 | 0 | 4 | 0.70 | NC | 24.63 | 0.52 | NC | 27.32 | 0 | NC | NC |
|  | 6 | 4 | 0 | 0 | 0.84 | 0.69 | 23.78 | 0.64 | 0.53 | 25.56 | 0.001 | 0.20 | 36.22 |
|  | 6 | 0 | 4 | 0 | 0.83 | 0.67 | 24.15 | 0.62 | 0.52 | 25.97 | 0 | NC | NC |
| 20 | 20 | 0 | 0 | 0 | 0.95 | NC | 40.05 | 0.73 | NC | 44.05 | 0 | NC | NC |
|  | 20 | 0 | 0 | 8 | 0.70 | NC | 45.32 | 0.52 | NC | 48.32 | 0 | NC | NC |
|  | 12 | 8 | 0 | 0 | 0.87 | 0.75 | 41.29 | 0.67 | 0.58 | 45.29 | 0 | NC | NC |
|  | 12 | 0 | 8 | 0 | 0.87 | 0.74 | 42.13 | 0.66 | 0.57 | 45.78 | 0 | NC | NC |

| Number of Objects | Visible Objects | Gadre et al. SNS↑ | Gadre et al. ENR↑ | Gadre et al. ATC(m) | Sarch et al. SNS↑ | Sarch et al. ENR↑ | Sarch et al. ATC(m) | Ghosh et al. [3] SNS↑ | Ghosh et al. [3] ENR↑ | Ghosh et al. [3] ATC(m) |
|---|---|---|---|---|---|---|---|---|---|---|
| 5 | 5 | 0.024 | NC | 20.15 | 0.058 | NC | 16.18 | 0.92 | NC | 13.58 |
|  | 5 | 0 | NC | NC | 0 | NC | NC | 0.66 | NC | 16.73 |
|  | 3 | 0.003 | 0.09 | 20.79 | 0.046 | 0.21 | 18.63 | 0 | NC | NC |
|  | 3 | 0.0 | NC | NC | 0 | NC | NC | 0 | NC | NC |
| 10 | 10 | 0.008 | NC | 36.69 | 0.032 | NC | 32.52 | 0.90 | NC | 27.98 |
|  | 10 | 0 | NC | NC | 0 | NC | NC | 0.65 | NC | 30.45 |
|  | 6 | 0.006 | 0.12 | 37.01 | 0.021 | 0.23 | 35.58 | 0 | NC | NC |
|  | 6 | 0 | NC | NC | 0 | NC | NC | 0 | NC | NC |
| 20 | 20 | 0 | NC | NC | 0 | NC | NC | 0.88 | NC | 50.79 |
|  | 20 | 0 | NC | NC | 0 | NC | NC | 0.62 | NC | 52.56 |
|  | 12 | 0 | NC | NC | 0 | NC | NC | 0 | NC | NC |
|  | 12 | 0 | NC | NC | 0 | NC | NC | 0 | NC | NC |

(OOF: Objects outside agent's field of view initially, which are visible from a different perspective, OPR: Objects placed inside closed receptacles, NC: Not computable). When there are no unseen objects, the ENR is NC. Similarly, when SNS is zero, ENR and ATC are NC. Weihs et al., Gadre et al., and Sarch et al. do not handle 20 objects and cannot resolve swap cases without explicit buffer or OPR cases (SNS=0). Ghosh et al. shows a slight decline in performance as the number of objects increase under complete visibility and swap cases but fails to account for unseen objects. In comparison, Ours significantly outperforms Weihs et al., Gadre et al. and Sarch et al. in terms of SNS, ENR, and ATC for visible objects, unseen objects, and swap cases without explicit buffer. Similarly, M200-GT performs better than Ghosh et al. in terms of SNS and ATC under complete visibility and swap cases without explicit buffer.

Thus, the method and system provides an end-to-end approach to address the task planning problem for room-rearrangement from an egocentric view under partial observability, using a user-defined goal state. The method discloses the Search Network that leverages object receptacle semantics using the commonsense knowledge from LLMs to predict the most probable receptacle for an unseen object.

rearrangement, but also considering the number of steps taken and the overall agent traversal.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means, and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

22

What is claimed is:

1. A processor implemented method for task planning for visual room rearrangement under partial observability, the method comprising:

capturing, by a robotic agent controlled by one or more hardware processors, an egocentric view of a room in an untidy current state comprising one or more objects among a plurality of objects in the room misplaced from associated receptacles, wherein the robotic agent is currently at a random location in the room with partial observability of the room;

identifying, by the robotic agent, an unseen object list by comparing i) a visible object list obtained from the egocentric view and ii) an object list of the plurality of objects created by the robotic agent in accordance with a user-specified tidy goal state, wherein an unseen object from the unseen object list is an object outside the robotic agent's present field of view, or an object placed within a closed receptacle;

triggering, by the robotic agent, a large language model (LLM) based search network to predict a most probable receptacle for each unseen object from among the unseen object list, wherein the LLM based search network applies a two steps search technique comprising:

filtering out, via a sorting network (SRTN), a set of receptacles from an object-receptacle list generated during learning phase of the robotic agent, wherein the filtering is in context of the unseen object list, wherein the filtered out set of receptacles belong to an implausible class, wherein the implausible class is a class in which the object is least probable to be identified; and identifying the most probable receptacle for each unseen object based on a probability score metric computed by a Scoring Network (SCN); wherein the robotic agent assumes the position of an unseen object to be the position of its most probable receptacle from the object-receptacle list created by the robotic agent in accordance with a user-specified tidy goal state, and wherein the robotic agent replans the search based on one or more conditions experienced during task planning execution;

creating, by the robotic agent, a graph embedding from the spatial graph representation of the untidy current state and the user-specified tidy goal state via a graph representation network (GRN), trained using an encoder and a decoder, to generate meaningful embeddings from the untidy current state and the user-specified tidy goal state graph that incorporates a residual relative path length notion between every pair of nodes associated with the untidy current state and the user-specified tidy goal state; and task planning, by the robotic agent, for visual room rearrangement via a Parameterized Deep-Q Network (P-DQN) with hybrid action space comprising a discrete action, denoting an index of a selected unseen object or the probable receptacle, followed by a continuous parameter which signifies a location for object placement or receptacle search, wherein the P-DQN uses a proxy reward network trained with episodic reward, generated from the stepwise hierarchical dense reward and overall episodic path length, and wherein the graph embedding enables state space of the P-DQN to understand semantic and geometric information of the untidy current state and the user-specified tidy goal state.

2. The processor implemented method of claim 1, wherein the robotic agent learns the user-specified tidy goal state prior to the task planning for visual room rearrangement by exploring the room, creating a two dimensional (2D) occupancy map for navigation of the agent, creating a 3D map to augment the detection of 3D object and 3D centroids of the receptacle to a fixed global reference frame, and generating the object-receptacle list with semantic labels and the 3D centroids.

3. The processor implemented method of claim 1, wherein the SRTN comprises a fully connected Multi-Layer Perceptron (MLP) trained using a cross entropy loss function ($L_{CE}$).

4. The processor implemented method of claim 1, wherein the SCN comprises a fully connected MLP trained using a mean of squared errors (MSE) loss function ($L_{MSE}$).

5. The processor implemented method of claim 1, wherein replanned sequence based on the one or more conditions experienced by the robotic agent comprises:

if the unseen object is not located at the most receptacle location the robotic agent approaches the next probable receptacle identified by the SCN, and prior prediction is discarded before re-planning a new sequence;

if a receptacle is identified without any of the unseen object from the unseen object list, the receptacle is eliminated form future search; and if the unseen object is found prior to reaching the most probable receptacle, the unseen object list is updated, and a new sequence is generated.

6. The processor implemented method of claim 1, wherein the encoder is a Graph Siamese Encoder Network (GSEN), and the decoder is a Residual Geodesic Distance Network (RGDN).

7. The processor implemented method of claim 1, wherein the sampling process used for training the proxy reward network uses a cluster-biased return reward (CB-RD) decomposition enabling reward distribution in the episode.

8. The processor implemented method of claim 1, wherein performance of the robotic agent in the task planning for visual room rearrangement is evaluated in terms of efficiency of agent traversal using a plurality of metrics comprising:

Success measured by the inverse Number of Steps (SNS) that utilizes uses a binary success rate to evaluate the successful completion of a rearrangement episode along with a number of steps taken by the robotic agent to rearrange a given number of objects;

Efficiency in Number of Re-plans (ENR) during object search by taking the ratio of the number of unseen objects initially with respect to the number of attempts to search; and Absolute Traversal Cost (ATC) indicating overall distance traversed by the robotic agent during the successful completion of a rearrangement episode.

9. A robotic agent for task planning for visual room rearrangement under partial observability, the system comprising:

a memory storing instructions;

one or more Input/Output (I/O) interfaces; and one or more hardware processors coupled to the memory via the one or more I/O interfaces, wherein the one or more hardware processors are configured by the instructions to:

capture an egocentric view of a room in an untidy current state comprising one or more objects among a plurality of objects in the room misplaced from associated receptacles, wherein the robotic agent is currently at a random location in the room with partial observability of the room;

identify an unseen object list by comparing i) a visible object list obtained from the egocentric view and ii) an object list of the plurality of objects created by the robotic agent in accordance with a user-specified tidy goal state, wherein an unseen object from the unseen object list is an object outside the robotic agent's present field of view, or an object placed within a closed receptacle;

trigger a large language model (LLM) based search network to predict a most probable receptacle for each unseen object from among the unseen object list, wherein the LLM based search network applies a two steps search technique comprising:

filtering out, via a sorting network (SRTN), a set of receptacles from an object-receptacle list generated during learning phase of the robotic agent, wherein the filtering is in context of the unseen object list, wherein the filtered out set of receptacles belong to an implausible class, wherein the implausible class is a class in which the object is least probable to be identified; and identifying the most probable receptacle for each unseen object based on a probability score metric computed by a Scoring Network (SCN); wherein the robotic agent assumes the position of an unseen object to be the position of its most probable receptacle from the object-receptacle list created by the robotic agent in accordance with a user-specified tidy goal state, and wherein the robotic agent replans the search based on one or more conditions experienced during task planning execution;

create a graph embedding from the spatial graph representation of the untidy current state and the user-specified tidy goal state via a graph representation network (GRN), trained using an encoder and a decoder, to generate meaningful embeddings from the untidy current state and the user-specified tidy goal state graph that incorporates a residual relative path length notion between every pair of nodes associated with the untidy current state and the user-specified tidy goal state; and perform task planning for visual room rearrangement via a Parameterized Deep-Q Network (P-DQN) with hybrid action space comprising a discrete action, denoting an index of a selected unseen object or the probable receptacle, followed by a continuous parameter which signifies a location for object placement or receptacle search, wherein the P-DQN uses a proxy reward network trained with episodic reward, generated from the stepwise hierarchical dense reward and overall episodic path length, and wherein the graph embedding enables state space of the P-DQN to understand semantic and geometric information of the untidy current state and the user-specified tidy goal state.

10. The robotic agent of claim 9, learns the user-specified tidy goal state prior to the task planning for visual room rearrangement by exploring the room, creating a two dimensional (2D) occupancy map for navigation of the agent, creating a 3D map to augment the detection of 3D object and 3D centroids of the receptacle to a fixed global reference frame, and generating the object-receptacle list with semantic labels and the 3D centroids.

11. The robotic agent of claim 9, wherein the SRTN comprises a fully connected Multi-Layer Perceptron (MLP) trained using a cross entropy loss function ($L_{CE}$).

12. The robotic agent of claim 9, wherein the SCN comprises a fully connected MLP trained using a mean of squared errors (MSE) loss function ($L_{MSE}$).

13. The robotic agent of claim 9, wherein replanned sequence based on the one or more conditions experienced by the robotic agent comprises:

if the unseen object is not located at the most receptacle location the robotic agent approaches the next probable receptacle identified by the SCN, and prior prediction is discarded before re-planning a new sequence;

if a receptacle is identified without any of the unseen object from the unseen object list, the receptacle is eliminated form future search; and if the unseen object is found prior to reaching the most probable receptacle, the unseen object list is updated, and a new sequence is generated.

14. The robotic agent of claim 9, wherein the encoder is a Graph Siamese Encoder Network (GSEN), and the decoder is a Residual Geodesic Distance Network (RGDN).

15. The robotic agent of claim 9, wherein the sampling process used for training the proxy reward network uses a cluster-biased return reward (CB-RD) decomposition enabling reward distribution in the episode.

16. The robotic agent of claim 9, wherein performance of the robotic agent in the task planning for visual room rearrangement is evaluated in terms of efficiency of agent traversal using a plurality of metrics comprising:

Success measured by the inverse Number of Steps (SNS) that utilizes uses a binary success rate to evaluate the successful completion of a rearrangement episode along with a number of steps taken by the robotic agent to rearrange a given number of objects;

Efficiency in Number of Re-plans (ENR) during object search by taking the ratio of the number of unseen objects initially with respect to the number of attempts to search; and Absolute Traversal Cost (ATC) indicating overall distance traversed by the robotic agent during the successful completion of a rearrangement episode.

17. One or more non-transitory computer readable mediums storing instructions, which when executed by a hardware processor, cause the hardware processor to perform actions comprising:

capturing, by a robotic agent, an egocentric view of a room in an untidy current state comprising one or more objects among a plurality of objects in the room misplaced from associated receptacles, wherein the robotic agent is currently at a random location in the room with partial observability of the room;

identifying, by the robotic agent, an unseen object list by comparing i) a visible object list obtained from the egocentric view and ii) an object list of the plurality of objects created by the robotic agent in accordance with a user-specified tidy goal state, wherein an unseen object from the unseen object list is an object outside the robotic agent's present field of view, or an object placed within a closed receptacle;

triggering, by the robotic agent, a large language model (LLM) based search network to predict a most probable receptacle for each unseen object from among the unseen object list, wherein the LLM based search network applies a two steps search technique comprising:

filtering out, via a sorting network (SRTN), a set of receptacles from an object-receptacle list generated during learning phase of the robotic agent, wherein the filtering is in context of the unseen object list, wherein the filtered out set of receptacles belong to an implausible class, wherein the implausible class is a class in which the object is least probable to be identified; and identifying the most probable receptacle for each unseen object based on a probability score metric computed by a Scoring Network (SCN); wherein the robotic agent assumes the position of an unseen object to be the position of its most probable receptacle from the object-receptacle list created by the robotic agent in accordance with a user-specified tidy goal state, and wherein the robotic agent replans the search based on one or more conditions experienced during task planning execution;

creating, by the robotic agent, a graph embedding from the spatial graph representation of the untidy current state and the user-specified tidy goal state via a graph representation network (GRN), trained using an encoder and a decoder, to generate meaningful embeddings from the untidy current state and the user-specified tidy goal state graph that incorporates a residual relative path length notion between every pair of nodes associated with the untidy current state and the user-specified tidy goal state; and task planning, by the robotic agent, for visual room rearrangement via a Parameterized Deep-Q Network (P-DQN) with hybrid action space comprising a discrete action, denoting an index of a selected unseen object or the probable receptacle, followed by a continuous parameter which signifies a location for object placement or receptacle search, wherein the P-DQN uses a proxy reward network trained with episodic reward, generated from the stepwise hierarchical dense reward and overall episodic path length, and wherein the graph embedding enables state space of the P-DQN to understand semantic and geometric information of the untidy current state and the user-specified tidy goal state.

18. The one or more non-transitory machine readable information storage mediums of claim 17, wherein the robotic agent learns the user-specified tidy goal state prior to the task planning for visual room rearrangement by exploring the room, creating a two dimensional (2D) occupancy map for navigation of the agent, creating a 3D map to augment the detection of 3D object and 3D centroids of the receptacle to a fixed global reference frame, and generating the object-receptacle list with semantic labels and the 3D centroids.

19. The one or more non-transitory machine readable information storage mediums of claim 17, wherein the SRTN comprises a fully connected Multi-Layer Perceptron (MLP) trained using a cross entropy loss function ($L_{CE}$).

20. The one or more non-transitory machine readable information storage mediums of claim 17, wherein the SCN comprises a fully connected MLP trained using a mean of squared errors (MSE) loss function ($L_{MSE}$).

* * * * *